United States Patent
Anantharam et al.

(10) Patent No.: US 10,103,935 B2
(45) Date of Patent: Oct. 16, 2018

(54) TRANSPORTING MULTI-DESTINATION NETWORKING TRAFFIC BY SENDING REPETITIVE UNICAST

(71) Applicant: International Business Machines Corporation, Armonk, NY (US)

(72) Inventors: Sushma Anantharam, Cupertino, CA (US); Amitabha Biswas, San Francisco, CA (US); Uday S. Nagaraj, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/845,797

(22) Filed: Sep. 4, 2015

(65) Prior Publication Data
US 2015/0381412 A1 Dec. 31, 2015

Related U.S. Application Data

(63) Continuation of application No. 14/046,108, filed on Oct. 4, 2013.

(51) Int. Cl.
*G06F 15/177* (2006.01)
*H04L 12/24* (2006.01)
(Continued)

(52) U.S. Cl.
CPC ...... *H04L 41/0803* (2013.01); *G06F 9/45533* (2013.01); *H04L 45/44* (2013.01)

(58) Field of Classification Search
CPC ............... H04L 12/4641; H04L 12/185; H04L 12/4633; H04L 29/12367; H04L 41/0803;
(Continued)

(56) References Cited

U.S. PATENT DOCUMENTS

| | | | |
|---|---|---|---|
| 6,891,839 B2 | 5/2005 | Albert et al. | |
| 7,007,100 B1 * | 2/2006 | Doong | H04L 45/00 370/389 |

(Continued)

OTHER PUBLICATIONS

Kamada, et al., "Design and Evaluation of Global Live Migration with Mobility Support for IP Multicast", 2012 IEEE/IPSJ 12th International Symposium on Applications and the Internet (SAINT), pp. 338-344, IEEE Computer Society, Copyright 2012 IEEE, 978-0-7695-4737-4/12, DOI 10.1109/SAINT.2012.61.

(Continued)

*Primary Examiner* — Razu A Miah
(74) *Attorney, Agent, or Firm* — Edward J Wixted, III (57) ABSTRACT

In a distributed network environment, a first virtual machine sends a first virtual machine control information to a first network system. The first network system sends a first control information to a first network control system in response to receiving the first virtual machine control information. The first network control system sends a portion of the first control information to a number of network systems. The first network control system sends a second control information to the first network system. The first virtual machine sends a first packet to the first network system which generates a unicast packet using a portion of the first packet and a portion of the second control information. A second network system receives and processes the unicast packet. The second network system sends a copy of the processed unicast packet to a second virtual machine associated with a second tenant.

17 Claims, 4 Drawing Sheets

(51) Int. Cl.
*H04L 12/721* (2013.01)
*G06F 9/455* (2018.01)

(58) Field of Classification Search
CPC ..... H04L 49/70; H04L 63/0272; H04L 12/66; H04L 41/0816; H04L 63/00; H04L 63/0227; H04L 69/16; H04L 69/22; H04L 45/44; G06F 9/45558; G06F 9/542; G06F 2009/45595; G06F 9/45533
See application file for complete search history.

(56) References Cited

U.S. PATENT DOCUMENTS

| | | | | |
|---|---|---|---|---|
| 7,180,856 | B1* | 2/2007 | Breslau | H04L 12/1868 370/230 |
| 7,802,000 | B1 | 9/2010 | Huang et al. | |
| 8,386,642 | B2 | 2/2013 | Elzur | |
| 8,514,890 | B2* | 8/2013 | Kidambi | H04L 45/586 370/392 |
| 8,656,482 | B1* | 2/2014 | Tosa | H04L 63/08 713/153 |
| 8,892,706 | B1* | 11/2014 | Dalal | H04L 12/4641 709/222 |
| 2006/0294211 | A1 | 12/2006 | Amato | |
| 2008/0107018 | A1* | 5/2008 | Zhang | H04L 12/1877 370/228 |
| 2009/0183173 | A1* | 7/2009 | Becker | G06F 9/45533 719/313 |
| 2009/0288084 | A1* | 11/2009 | Astete | G06F 9/45533 718/1 |
| 2009/0300209 | A1 | 12/2009 | Elzur | |
| 2010/0046516 | A1* | 2/2010 | Fernandez Gutierrez | H04L 12/185 370/390 |
| 2010/0138830 | A1* | 6/2010 | Astete | G06F 9/45533 718/1 |
| 2010/0223397 | A1 | 9/2010 | Elzur | |
| 2011/0093740 | A1* | 4/2011 | Tsao | H04L 67/1097 714/4.12 |
| 2011/0096789 | A1* | 4/2011 | Lin | H04L 12/4641 370/401 |
| 2011/0149960 | A1* | 6/2011 | Fernandez Gutierrez | H04L 12/18 370/390 |
| 2011/0184993 | A1* | 7/2011 | Chawla | G06F 9/45533 707/802 |
| 2011/0243138 | A1 | 10/2011 | Oh et al. | |
| 2012/0036236 | A1 | 2/2012 | Richardson et al. | |
| 2012/0072909 | A1* | 3/2012 | Malik | H04L 12/4641 718/1 |
| 2012/0096158 | A1* | 4/2012 | Astete | G06F 9/45533 709/225 |
| 2012/0230223 | A1* | 9/2012 | Taguchi | H04L 12/4641 370/254 |
| 2013/0107710 | A1* | 5/2013 | DeVilbiss | H04L 41/0659 370/235 |
| 2013/0136123 | A1 | 5/2013 | Ge et al. | |
| 2013/0205296 | A1 | 8/2013 | Cardona et al. | |
| 2014/0115578 | A1* | 4/2014 | Cooper | H04L 63/1416 718/1 |
| 2014/0133354 | A1 | 5/2014 | Scharf et al. | |
| 2014/0137180 | A1* | 5/2014 | Lukacs | G06F 21/53 726/1 |
| 2014/0185616 | A1* | 7/2014 | Bloch | G06F 9/45533 370/392 |
| 2014/0247753 | A1* | 9/2014 | Koponen | H04L 45/64 370/255 |
| 2015/0100670 | A1 | 4/2015 | Anantharam et al. | |

OTHER PUBLICATIONS

Cisco, "Overlay Transport Virtualization (OTV) Inter-DC Multicast Traffic over Unicast Transport", Cisco Systems, Inc., Jun. 14, 2012, pp. 1-8, Copyright 2012 Cisco Systems, Inc.

Elaoud et al., "Cross-Layer Optimized Unicast and Multicast Routing on Overlay Networks", 2006, IEEE, MILCOM 2005, 2006 IEEE Military Communications Conference, pp. 1122-1126, vol. 5.

* cited by examiner

TRANSPORTING MULTI-DESTINATION NETWORKING TRAFFIC BY SENDING REPETITIVE UNICAST

FIELD OF THE INVENTION

The present invention relates generally to the field of computer networking, and more particularly to transporting multi-destinational network traffic.

BACKGROUND OF THE INVENTION

Many current implementations of multicast data transmission require that every networking device connecting the sender and receiver be updated to support multicast technology efficiently. Most traditional underlay networks support only unicast transmissions of information, where a transmission of information is initialized by direct communication between the sender and receiver of a transmission. As more nodes are added into a network, and traffic is sent too many destinations simultaneously, communicating directly with every receiver becomes inefficient. However, there may be advantages to the use of a system for transporting multicast and broadcast traffic more easily using an underlay network which supports only unicast transmissions.

SUMMARY

Embodiments of the present invention disclose a method, computer program product, and system for transporting multi-destinational network traffic using repetitive unicast transmissions in the underlay. A first virtual machine of the distributed network sends a first virtual machine control information to a first network system of the distributed network. The first virtual machine is associated with a first tenant of the distributed network and is configured to communicate with the first network system. The first virtual machine control information is associated with the first virtual machine and the first tenant. The first network system sends a first control information to a first network control system of the distributed network in response to receiving the first virtual machine control information. The first control information is based, at least in part, on the first virtual machine control information. The first network control system sends at least a portion of the first control information to a number of network systems included in a plurality of network systems that are included in the distributed network. The first network control system sends a second control information to the first network system. The second control information is based, at least in part, on the first control information.

DETAILED DESCRIPTION

Most traditional underlay networks support only unicast transmissions of information, where a transmission of information is initialized by direct communication between the sender and receiver of a transmission. As more nodes are added into a network, and traffic is sent to many destinations simultaneously, communicating directly with every receiver becomes inefficient. The present invention includes a system, method and computer program product for transporting overlay multi-destinational traffic in an overlay network using repetitive unicast transmissions sent through an underlay network. Virtual machines are connected to a network via networking systems (also called network systems), each of which maintains a record of the virtual machines which are connected to it. Collected records are synchronized with a networking control system (also called network control system), which updates all networking systems in the event that a change is made to the network. Multi-destinational traffic is sent to and from virtual machines by sending transmissions through networking systems which encapsulate multi-destinational transmissions within unicast transmissions so that they can be passed through the underlay network. Once a transmission is received by a second networking system, it is de-capsulated then forwarded to each virtual machine which is determined to be a recipient of the transmission.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
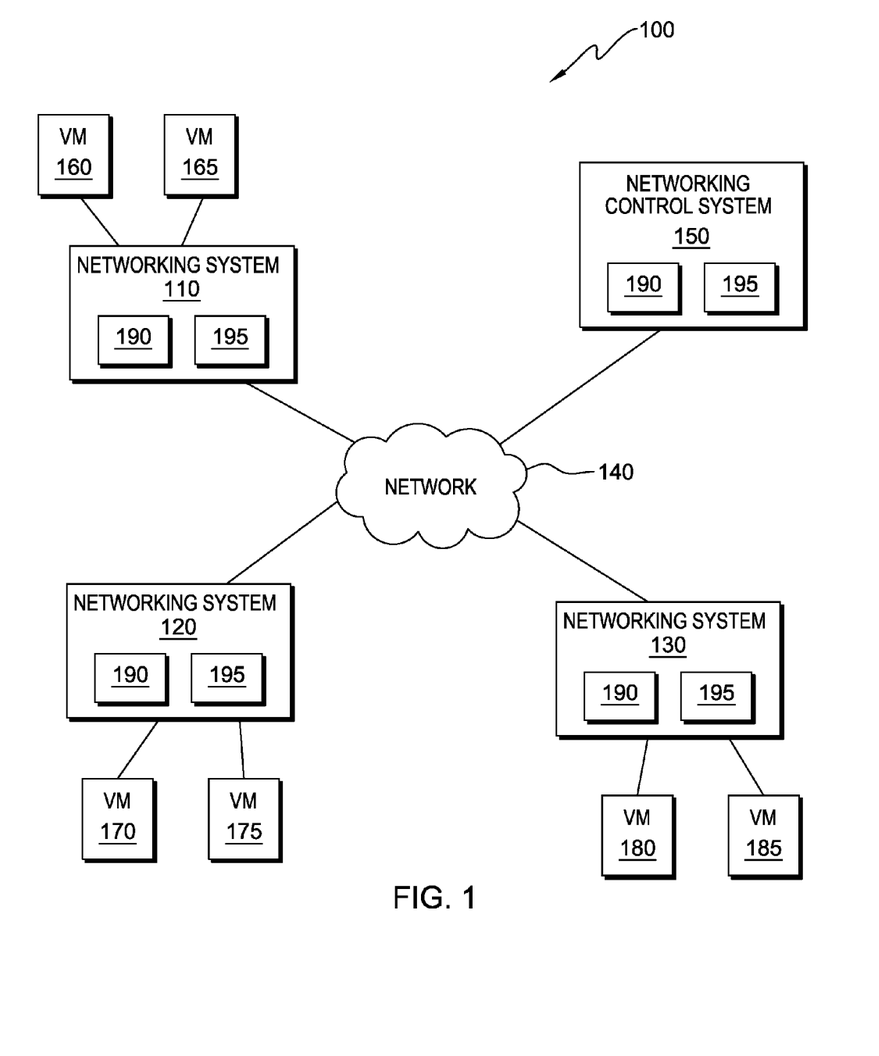
FIG. 1 is a functional block diagram illustrating a distributed network environment, in accordance with an embodiment of the present invention

The present invention will now be described in detail with reference to the Figures. FIG. 1 is a functional block diagram illustrating a distributed network environment, generally designated 100, in accordance with one embodiment of the present invention. Distributed network environment 100 contains networking system 110, 120 and 130, network 140, networking control system 150, and virtual machines 160, 165,170, 175, 180, and 185, virtual machine configuration program 190, and data transfer program 195.

Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between networking system 110, 120 and 130, networking control system 150, virtual machines 160, 165, 170, 175, 180, and 185, virtual machine configuration program 190, and data transfer program 195.

In various embodiments of the present invention, networking system 110, 120 and 130 are computing devices which can be standalone devices, servers, laptop computers, tablet computers, netbook computers, personal computers (PCs), or desktop computers. In another embodiment, networking system 110, 120 and 130 each represent a computing system utilizing clustered computers and components to act as a single pool of seamless resources. In general, networking system 110, 120 and 130 can be any computing device or a combination of devices with access to network 140 and virtual machines 160, 165, 170, 175, 180, and 185, and are capable of executing virtual machine configuration program 190, and data transfer program 195. Within the context of distributed network system 100, networking system 110, 120 and 130 act as VNIDs (Virtual Network Interface Devices). Networking system 110, 120 and 130 may include internal and external hardware components, as depicted and described in further detail with respect to FIG. 4.

Virtual machines (VMs) 160, 165, 170, 175, 180, and 185 are software implemented abstractions of hardware included in networking system 110, 120 and 130. In general, virtual machines 160, 165, 170, 175, 180, and 185 can be used to emulate functions of a physical computer (e.g., execute programs). In another embodiment, virtual machines 160, 165, 170, 175, 180, and 185 are representations of virtual devices that are being implemented on networking system 110, 120 and 130. In one embodiment, the resources of networking system 110, 120 and 130 (e.g., memory, central processing units (CPUs), storage devices, and 110 devices) can be partitioned for use by one or more virtual machines including virtual machines 160, 165, 170, 175, 180, and 185.

Networking control system 150 is a computing device which acts as a system controller for distributed network environment 100. In various embodiments of the present invention, networking control system 150 is a computing device that can be a standalone device, a server, a laptop computer, a tablet computer, a netbook computer, a personal computer (PC), or a desktop computer. In another embodiment, networking control system 150 represents a computing system utilizing clustered computers and components to act as a single pool of seamless resources. In general, networking control system 150 can be any computing device or a combination of devices with access to networking systems 110, 120, and 130, network 140 and virtual machines 160, 165, 170, 175, 180, and 185, and is capable of executing virtual machine configuration program 190, and data transfer program 195. Networking control system 150 may include internal and external hardware components, as depicted and described in further detail with respect to FIG. 4.

Virtual machine configuration program 190 is a software program that configures distributed network environment 100 to send and receive transmissions of information to and from a new virtual machine which is added to distributed network environment 100. Virtual machine configuration program 190 is installed onto networking system 110, 120 and 130, and networking control system 150, with each device executing a segment of virtual machine configuration program 190.

Data transfer program 195 is a software program that facilitates broadcast and multicast transmissions of information between two or more virtual machines within distributed network environment 100. Data transfer program 195 is installed onto networking system 110, 120 and 130, and networking control system 150, with each device executing a segment of data transfer program 195.

This exemplary embodiment of the present invention includes a first and a second tenant. The first tenant includes virtual machines 160, 170, and 180 while the second tenant includes virtual machines 165, 175, and 185. In general, a tenant is a collection of VNETs or virtual machines which must have its traffic isolated from other tenants within a network.

This exemplary embodiment of the present invention includes a first and a second VNET, each comprising an enclosed virtual network connected to network 140. A first VNET includes networking systems 110 and 120 as well as virtual machines 160, 165, 170, and 175. A second VNET contains networking system 130 and virtual machines 180 and 185. In general, a VNET is a group of virtual machines which are controlled by one or more common policies. In an exemplary embodiment of the present invention, a policy includes a set of rules for transferring information between VNETs.

Figure 2:
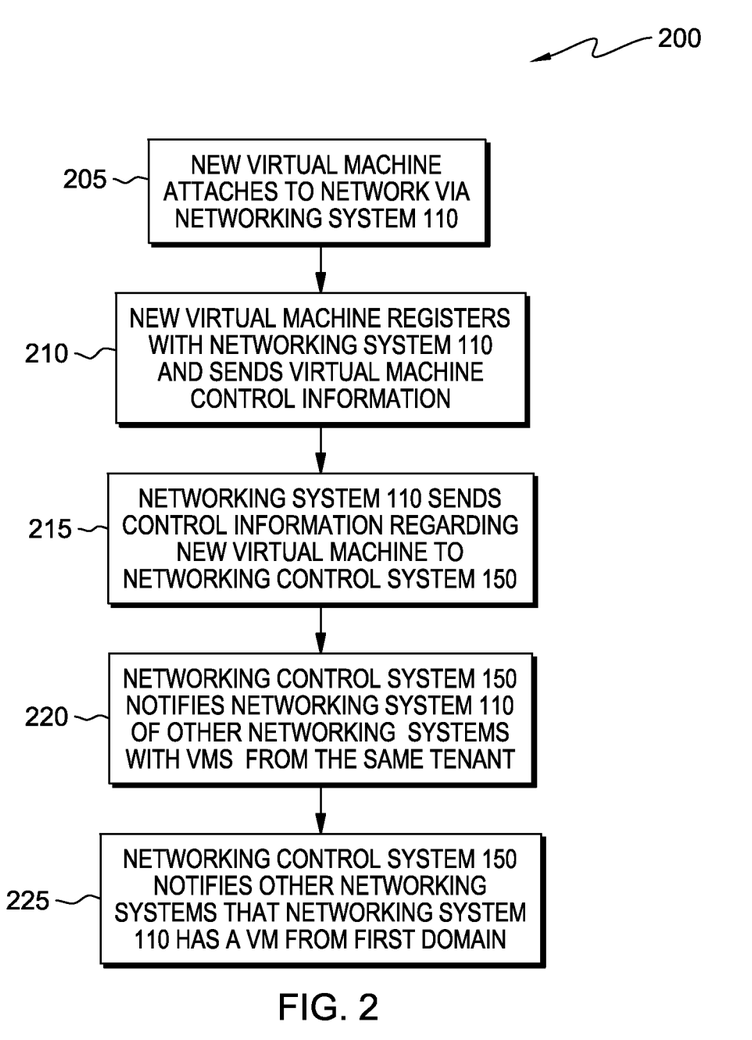
FIG. 2 is a flowchart depicting operational steps of a new virtual machine integrating into the distributed network environment of FIG. 1.

FIG. 2 is a flowchart, 200, depicting operational steps utilized by virtual machine configuration program 190 to configure distributed network environment 100 to send and receive transmissions of information to and from a new virtual machine, which is added to distributed network environment 100, in accordance with one embodiment of the present invention.

In an exemplary embodiment of the present invention, virtual machine 160 is added to distributed network environment 100 via networking system 110 in step 205. In this exemplary embodiment, virtual machine 160 is a member of a tenant generally designated the first tenant, and a VNET generally designated the first VNET.

Virtual machine 160 registers with networking system 110 and sends virtual machine control information to networking system 110, which receives the virtual machine control information, in step 210. In an exemplary embodiment, virtual machine control information includes information associated with the new virtual machine, the first tenant, and the first VNET. In general, virtual machine control information includes information associated with the tenant and VNET of which the new virtual machine is a member.

Upon receiving virtual machine control information from a new virtual machine, networking system 110 sends control information to networking control system 150 in step 215. Control information is based, at least in part, on the virtual machine control information received in step 210 and ID information used to represent the networking system and a virtual machine that it connects to. The received virtual machine control information is used by networking control system 150 to update an internal record of all present virtual machines and their respective tenants and VNETs within distributed network environment 100. In this exemplary embodiment, networking system 150 receives information related to virtual machine 160, the first tenant, and the first VNET which are added to internal records stored within networking system 150.

In this exemplary embodiment, networking control system 150 sends information to networking system 110 in step 220. This information describes all other networking systems containing virtual machines which are members of the same domain and/or VNET as the new virtual machine, e.g., VM 160, using either database records to be stored by networking system 110 or a set of ID information referencing each networking system and its virtual machines, in step 220. In this exemplary embodiment, the information received by networking system 110 in step 220 includes information about virtual machines 170 and 180 which are both within tenant one, as well as the networking systems that they are connected to. The received information is used by networking system 110 to route appropriate traffic to and from virtual machine 160.

Networking control system 150 sends necessary control information to all other networking systems in step 225. The received information is used to inform networking systems that a new virtual machine has attached to the network through a networking system, and also to provide information such as the tenant and VNET of which the new virtual machine is a member. Control information is based, at least in part, on the virtual machine control information received in step 210 and ID information used to represent the networking system and a virtual machine that it connects to. In this exemplary embodiment, networking systems 120 and 130 receive information from networking control system 150 which indicates that virtual machine 160 has joined distributed network system 100 via networking system 110, as well as that virtual machine 160 is a member of a first tenant and a first VNET.

Figure 3:
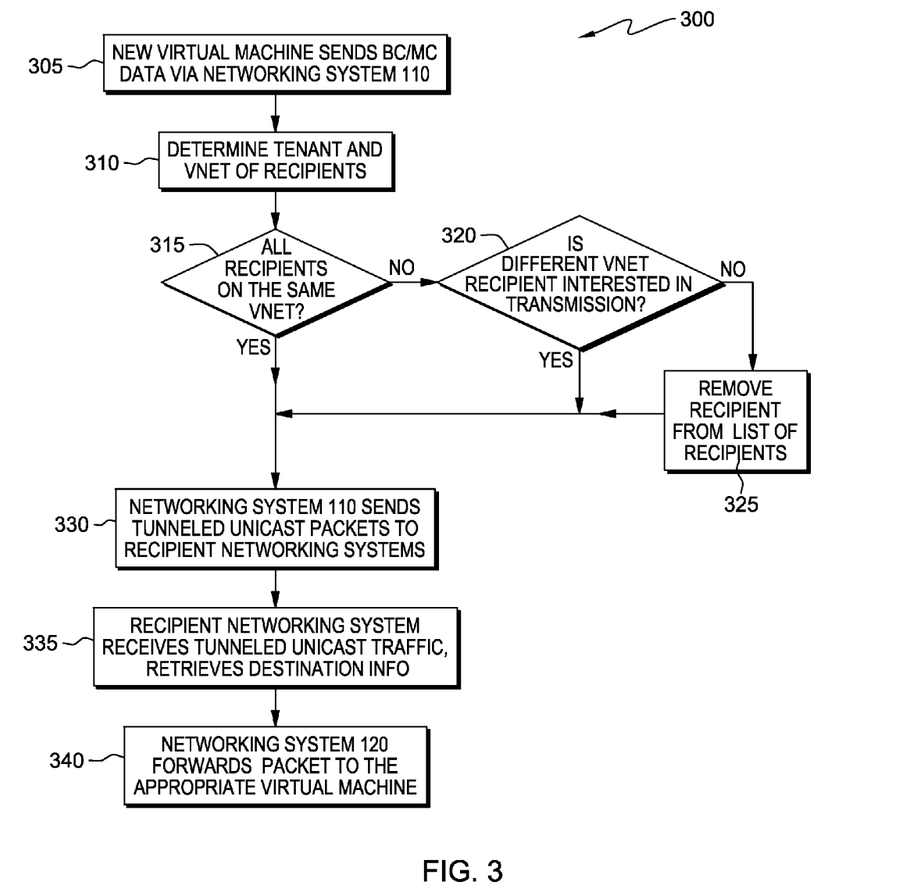
FIG. 3 illustrates operational steps of an exemplary multicast transmission of information from one virtual machine to two recipients within the distributed network environment of FIG. 1.

FIG. 3 is a flowchart, 300, depicting operational steps of data transfer program 195. Data transfer program 195 is a software program that facilitates broadcast and multicast transmissions of information between two ore more virtual machines within distributed network environment 100. In an exemplary embodiment of the present invention, virtual machine 160 sends a multicast transmission to virtual machines 170 and 180 via networking system 110.

In the exemplary embodiment, the multicast transmission is initiated by virtual machine 160 in step 305. A multicast transmission can be any transmission of computer-readable information sent to two or more recipients. Multicast transmissions can include IP multicast transmissions, Internet relay chat (IRC) transmissions, or any other digital multicast information transmission known in the art. Other embodiments include a broadcast transmission being initiated by a virtual machine to all other virtual machines within the same tenant and/or VNET within distributed network environment 100. An exemplary embodiment of a broadcast transmission includes virtual machine 160 initiating a broadcast transmission to all virtual machines within the first VNET.

Upon receiving a multicast transmission from virtual machine 160, networking system 110 utilizes the control information received from networking control system 150 to determine which networking systems access the recipient virtual machines. Networking system 110 also determines the tenants and VNETs associated with the recipient virtual machines in step 310. In this exemplary embodiment, networking systems 120 and 130 are determined to be hosts of virtual machines 170 and 180, which are intended recipients of the current multicast transmission. Virtual machine 170 is determined to be a member of a first tenant and a first VNET, while virtual machine 180 is determined to be a member of a first tenant and a second VNET.

Networking system 110 checks if any of the recipients are members of a different VNET from that of the sender of the transmission in decision step 315. The VNET of each of the recipient virtual machines is determined using the control information received from networking control system 150. If all of the recipients of the transmission are members of the same VNET (decision step 315, yes branch), then networking system 110 proceeds with sending encapsulated unicast packets to the recipient networking systems in step 330.

In the event that there is at least one virtual machine which is a member of a different VNET from the sender of the transmission (decision step 315, no branch), networking system 110 determines the relevant VNET that the recipient belongs to. Networking system 110 then communicates with the recipient virtual machine belonging to the determined VNET to determine if the virtual machine is interested in receiving the transmission, in decision step 320. In this exemplary embodiment, virtual machines 160 and 170 are members of a first VNET, while virtual machine 180 is a member of a second VNET. In this exemplary embodiment networking system 110 communicates with networking system 130 to determine if virtual machine 180 is interested in receiving the transmission from virtual machine 160.

If networking system 110 determines that a virtual machine from an outside VNET is interested in receiving the transmission (decision step 320, yes branch), then network system 110 proceeds with the transmission to all intended recipients, in step 330. In an exemplary embodiment, networking system 110 determines that virtual machine 180 is interested in receiving the transmission from virtual machine 160, then networking system 110 proceeds with the transmission to all intended recipients in step 330.

If networking system 110 determines that a virtual machine from an outside VNET is not interested in receiving the transmission (decision step 320, no branch), then networking system 110 proceeds to step 325. In an exemplary embodiment, if a given virtual machine indicates that it is not interested in receiving a transmission from virtual machine 160, then networking system 110 would proceed to remove virtual machine 180 from the list of intended recipients in step 325.

Virtual machines that are determined to not be interested in receiving a transmission from a virtual machine are removed from the list of recipients in step 325. In an exemplary embodiment, if virtual machine 180 were to indicate that it was not interested in receiving a transmission from virtual machine 160, then virtual machine 180 would be removed from the list of recipients. After a virtual machine is removed form the list of recipients, a networking system proceeds to send an encapsulated transmission in step 330.

In step 330, encapsulated unicast transmissions are sent to all network systems which are determined to have an interest in receiving the transmission. The traffic is encapsulated by networking system 110 into unicast traffic so that the multicast transmission can be passed through network 140 successfully. Each packet of unicast traffic prepared by the networking system contains at least a portion of the packet received from the virtual machine which initiated the transmission, at least a portion of the ID information received from networking control system 150, and a header including the destination address of the networking system receiving the packet. The networking system sending the transmission creates one packet of unicast traffic for each networking system which receives the transmission. In this exemplary embodiment, networking system 110 creates one packet of unicast traffic to be sent to networking system 120 and one packet of unicast traffic to be sent to networking system 130. In other exemplary embodiments where two ore more virtual machines which are recipients of the traffic are connected to a single networking system, a single packet of unicast traffic is created by networking system 110 which is sent to the networking system hosting all of the recipient virtual machines.

In exemplary embodiments where a recipient networking system receives a transmission that no connected virtual machines are able to receive in accordance with local policy, the networking system notifies networking control system 150 and causes all other networking systems to update their internal records. Internal records comprise a list of receiving networking systems and the virtual machines from each tenant that are registered with each networking system. Internal records are updated by the networking control system 150 providing information about the change in records to each networking system within the network. The information provided by networking control system 150 can include either information related to the specific change that needs to be updated in the records of each networking system, or a new complete set of records that can be used by each networking system to either update or replace its current records.

In an exemplary embodiment, the packet sent by networking system 110 is received by networking system 120 and 130 respectively and de-capsulated. Within the encapsulated packet is the multicast packet created and sent by virtual machine 160 as well as a portion of the ID information received from networking control system 150. Once the packet is de-capsulated, destination information is received and the destination tenant and virtual machines are determined in step 335.

Once a recipient virtual machine is determined, the received packet is forwarded to an appropriate virtual machine, in step 340. In exemplary embodiments where multiple virtual machines connected to a networking system are determined to be recipients of the transmission, a copy of the received packet will be sent to each virtual machine. An appropriate virtual machine is determined based on at least one of: a) a tenant intended to receive the transmission, b) a virtual machine intended to receive the transmission, or c) a security policy implemented by the networking system.

In this exemplary embodiment, virtual machine configuration program 190 and data transfer program 195 are stored on networking system 110, 120 and 130, and networking control system 150. However, in other embodiments, virtual machine configuration program 190 and data transfer program 195 may be stored externally and accessed through a communication network such as network 140. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between networking system 110, 120 and 130, and networking control system 150, and virtual machine configuration program 190 and data transfer program 195 in accordance with a desired embodiment of the present invention.

Figure 4:
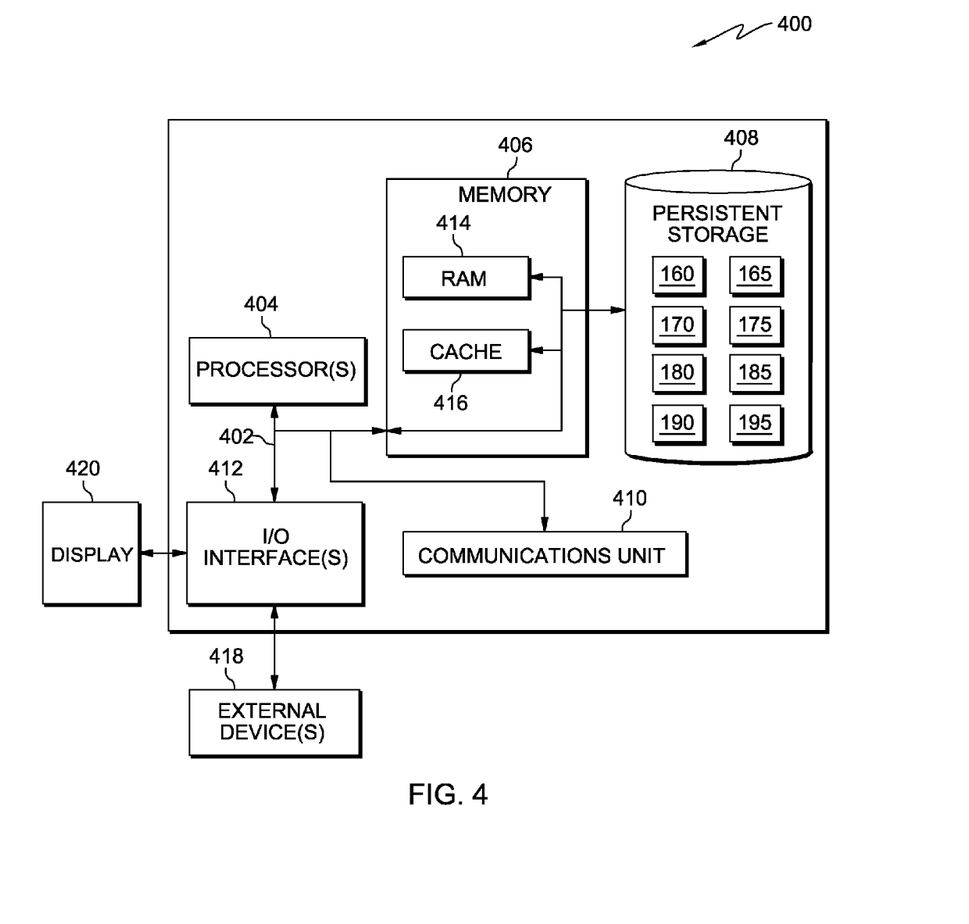
FIG. 4 is a block diagram of components of networking systems and networking control systems executing a virtual machine configuration program and a data transfer program, in accordance with an embodiment of the present invention.

FIG. 4 depicts a block diagram of respective components of networking system 110, 120 and 130, and networking control system 150 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Networking system 110, 120 and 130, and networking control system 150 include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

VM 160, 165, 170, 175, 180 and 185, Virtual machine configuration program 190 and data transfer program 195 are stored in persistent storage 408 for execution and or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of enterprise grid 112 and client devices 104, 106, and 108. In these examples, communications unit 410 includes one or more network interface cards. Communications unit 410 may provide communications through the use of either or both physical and wireless communications links. VM 160, 165, 170, 175, 180 and 185, Virtual machine configuration program 190 and data transfer program 195 may be downloaded to persistent storage 408 through communications unit 410.

I/O interface(s) 412 allows for input and output of data with other devices that may be connected to network system 110, 120 and 130, or network control system 150. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g. virtual machine configuration program 190 and data transfer program 195, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for configuring a network, the method comprising:
   receiving, by a first network computer, an indication that a first virtual machine has operatively coupled to a network via the first network computer;
   receiving, by the first network computer, a first virtual machine control information from the first virtual machine, wherein the first virtual machine control information identifies the first virtual machine and a tenant with which the first virtual machine is associated;
   sending, by the first network computer, a first network control information to a network control computer, wherein the first network control information includes at least a portion of the first virtual machine control information; and
   receiving, by the first network computer, a second network control information from the network control computer, wherein the second network control information describes a second virtual machine, operatively coupled to the network via a second network computer, and wherein the second virtual machine is capable of communicating with the first virtual machine, and wherein the second virtual machine is determined based on a policy of the network, wherein the policy includes a set of rules for transferring information;
   receiving, by the first network computer, a first list, wherein the first list is a list of each virtual machine that is operatively coupled to the network, wherein the list is synchronized with the network control computer, which updates the network when a change is made to the network;
   receiving, by the first network computer, a multicast packet sent from the first virtual machine to appropriate virtual machines associated with the tenant, including, at least, the second virtual machine;

determining, by the first network computer, network computers operatively coupled to virtual machines associated with the tenant, including, at least, the second network computer, based on, at least, the second network control information, wherein the appropriate virtual machines associated with the tenant are determined based on: a tenant intended to receive a transmission, a virtual machine intended to receive the transmission, and the policy;

encapsulating, by the first network computer, the multicast packet within a unicast packet for each determined network computer, including, at least, the second network computer; and sending, by the first network computer, each unicast packet to each respective network computer, including, at least, the second network computer.

2. The method of claim 1, further comprising:
responsive to a third virtual machine attaching to the network via a third network computer, receiving, by the first network computer, a third network control information, wherein the third network control information describes the location of the third virtual machine within the network.

3. The method of claim 1, wherein the first virtual machine and the second virtual machine are included within the tenant.

4. The method of claim 3, wherein the tenant is a group of virtual machines configured to:
communicate with each virtual machine of the group of virtual machines; and
prevent communication with virtual machines outside of the group of virtual machines.

5. The method of claim 1, wherein:
the first network control information further includes identification information of the first network computer; and
the second network control information further describes additional network control computers operatively coupled to one or more additional virtual machines associated with the tenant.

6. The method of claim 1, further comprising:
receiving, by the first network computer, a multicast packet sent from the first virtual machine to at least the second virtual machine;
encapsulating, by the first network computer, the multicast packet within a unicast packet, wherein the unicast packet contains, at least, a portion of the multicast packet, a portion of the second network control information, and a header, wherein the header includes a destination address of the second network computer; and
sending, by the first network computer, the unicast packet to at least the second network computer.

7. A computer program product for configuring a network, the computer program product comprising:
one or more computer readable storage media and program instructions stored on the one or more computer readable storage media, wherein the one or more computer readable storage media are not transitory signals per se, the program instructions comprising:
program instructions to receive, by a first network computer, an indication that a first virtual machine has operatively coupled to a network via the first network computer;

program instructions to receive, by the first network computer, a first virtual machine control information from the first virtual machine, wherein the first virtual machine control information identifies the first virtual machine and a tenant with which the first virtual machine is associated;

program instructions to send, by the first network computer, a first network control information to a network control computer, wherein the first network control information includes at least a portion of the first virtual machine control information; and program instructions to receive, by the first network computer, a second network control information from the network control computer, wherein the second network control information describes a second virtual machine, operatively coupled to the network via a second network computer, and wherein the second virtual machine is capable of communicating with the first virtual machine, and wherein the second virtual machine is determined based on a policy of the network, wherein the policy includes a set of rules for transferring information;

program instructions to receive, by the first network computer, a first list, wherein the first list is a list of each virtual machine that is operatively coupled to the network, wherein the list is synchronized with the network control computer, which updates the network when a change is made to the network;

program instructions, stored on the one or more computer readable storage devices, to receive, by the first network computer, a multicast packet sent from the first virtual machine to appropriate virtual machines associated with the tenant, including, at least, the second virtual machine;

program instructions, stored on the one or more computer readable storage devices, to determine, by the first network computer, network computers operatively coupled to virtual machines associated with the tenant, including, at least, the second network computer, based on, at least, the second network control information, wherein the appropriate virtual machines associated with the tenant are determined based on: a tenant intended to receive a transmission, a virtual machine intended to receive the transmission, and the policy;

program instructions, stored on the one or more computer readable storage devices, to encapsulate, by the first network computer, the multicast packet within a unicast packet for each determined network computer, including, at least, the second network computer; and program instructions, stored on the one or more computer readable storage devices, to send, by the first network computer, each unicast packet to each respective network computer, including, at least, the second network computer.

8. The computer program product of claim 7, further comprising:
program instructions, stored on the one or more computer readable storage devices, to, responsive to a third virtual machine attaching to the network via a third network computer, receive, by the first network computer, a third network control information, wherein the third network control information describes the location of the third virtual machine within the network.

9. The computer program product of claim 7, wherein the first virtual machine and the second virtual machine are included within the tenant.

10. The computer program product of claim 9, wherein the tenant is a group of virtual machines configured to:
communicate with each virtual machine of the group of virtual machines; and
prevent communication with virtual machines outside of the group of virtual machines.

11. The computer program product of claim 7, wherein:
the first network control information further includes identification information of the first network computer; and
the second network control information further describes additional network control computers operatively coupled to one or more additional virtual machines associated with the tenant.

12. The computer program product of claim 7, further comprising:
program instructions, stored on the one or more computer readable storage devices, to receive, by the first network computer, a multicast packet sent from the first virtual machine to at least the second virtual machine;
program instructions, stored on the one or more computer readable storage devices, to encapsulate, by the first network computer, the multicast packet within a unicast packet, wherein the unicast packet contains, at least, a portion of the multicast packet, a portion of the second network control information, and a header, wherein the header includes a destination address of the second network computer; and
program instructions, stored on the one or more computer readable storage devices, to send, by the first network computer, the unicast packet to at least the second network computer.

13. A computer system for configuring a network, the computer system comprising:
one or more computer processors, one or more computer readable storage media, and program instructions stored on the one or more computer readable storage media for execution by at least one of the one or more computer processors, wherein the one or more computer readable storage media are not transitory signals per se, the program instructions comprising:
program instructions to receive, by a first network computer, an indication that a first virtual machine has operatively coupled to a network via the first network computer;
program instructions to receive, by the first network computer, a first virtual machine control information from the first virtual machine, wherein the first virtual machine control information identifies the first virtual machine and a tenant with which the first virtual machine is associated;
program instructions to send, by the first network computer, a first network control information to a network control computer, wherein the first network control information includes at least a portion of the first virtual machine control information; and
program instructions to receive, by the first network computer, a second network control information from the network control computer, wherein the second network control information describes a second virtual machine, operatively coupled to the network via a second network computer, and wherein the second virtual machine is capable of communicating with the first virtual machine, and wherein the second virtual machine is determined based on a policy of the network, wherein the policy includes a set of rules for transferring information;
program instructions to receive, by the first network computer, a first list, wherein the first list is a list of each virtual machine that is operatively coupled to the network, wherein the list is synchronized with the network control computer, which updates the network when a change is made to the network;
program instructions, stored on the computer readable storage devices for execution by at least one of the one or more processors, to receive, by the first network computer, a multicast packet sent from the first virtual machine to appropriate virtual machines associated with the tenant, including, at least, the second virtual machine;
program instructions, stored on the computer readable storage devices for execution by at least one of the one or more processors, to determine, by the first network computer, network computers operatively coupled to virtual machines associated with the tenant, including, at least, the second network computer, based on, at least, the second network control information, wherein the appropriate virtual machines associated with the tenant are determined based on: a tenant intended to receive a transmission, a virtual machine intended to receive the transmission, and the policy;
program instructions, stored on the computer readable storage devices for execution by at least one of the one or more processors, to encapsulate, by the first network computer, the multicast packet within a unicast packet for each determined network computer, including, at least, the second network computer; and
program instructions, stored on the computer readable storage devices for execution by at least one of the one or more processors, to send, by the first network computer, each unicast packet to each respective network computer, including, at least, the second network computer.

14. The computer system of claim 13, further comprising:
program instructions, stored on the computer readable storage devices for execution by at least one of the one or more processors, to, responsive to a third virtual machine attaching to the network via a third network computer, receive, by the first network computer, a third network control information, wherein the third network control information describes the location of the third virtual machine within the network.

15. The computer system of claim 13, wherein the tenant is a group of virtual machines configured to:
communicate with each virtual machine of the group of virtual machines; and
prevent communication with virtual machines outside of the group of virtual machines.

16. The computer system of claim 13, wherein:
the first network control information further includes identification information of the first network computer; and
the second network control information further describes additional network control computers operatively coupled to one or more additional virtual machines associated with the tenant.

17. The method of claim 1, further comprising:
receiving, by the first network computer, a multicast packet sent from the first virtual machine;
determining, by the first network computer, there are no virtual machines able to receive the multicast packet, based on, at least, the policy; and
causing, by the first network computer, each networking system to update internal records to reflect that there are no virtual machines within each respective networking system that are able to receive the multicast packet, wherein the internal records include, at least, the first list and a second list, wherein the second list is a list of receiving networking systems.

* * * * *